United States Patent [19]

Johnson et al.

[11] Patent Number: 4,664,497

[45] Date of Patent: May 12, 1987

[54] CAMERA HAVING CHAMBER FOR STORING EXPOSED FILM UNITS DURING THEIR DEVELOPMENT

[75] Inventors: Bruce K. Johnson, Andover; George D. Whiteside, Lexington, both of Mass.

[73] Assignee: Polaroid Corporation, Cambridge, Mass.

[21] Appl. No.: 881,269

[22] Filed: Jul. 2, 1986

[51] Int. Cl.⁴ .............................................. G03B 17/52
[52] U.S. Cl. ................................. 354/86; 354/173.1; 354/212
[58] Field of Search ....................... 354/83, 84, 85, 86, 354/87, 173.1, 173.11, 212, 187

[56] References Cited

U.S. PATENT DOCUMENTS

| | | | |
|---|---|---|---|
| 2,794,377 | 6/1957 | Fairbank | 354/299 |
| 2,819,662 | 1/1958 | Land | 354/86 |
| 2,854,903 | 10/1958 | Land et al. | 354/86 |
| 3,405,619 | 10/1968 | Land | 354/84 |
| 3,426,664 | 2/1969 | Norton | 354/86 |
| 3,446,131 | 5/1969 | Cook et al. | 354/83 |
| 3,537,370 | 11/1970 | Wareham | 354/86 |
| 3,683,771 | 8/1972 | Land | 354/86 |
| 3,687,032 | 8/1972 | Erlichman | 354/212 |
| 4,114,166 | 9/1978 | Driscoll et al. | 354/76 |
| 4,265,525 | 5/1981 | Stella et al. | 354/76 |
| 4,569,578 | 2/1986 | Stella et al. | 354/86 |

Primary Examiner—A. A. Mathews
Attorney, Agent, or Firm—Alfred E. Corrigan

[57] ABSTRACT

An instant type camera having structure for moving an exposed self-developing type film unit from an exposure position within a film cassette to a lighttight imbibition chamber located behind the film cassette in which chamber the film unit remains during the formation of a visible image. A wall of the lighttight imbibition chamber includes a film loading door having a window therein for viewing a film unit located in the imbibition chamber. The window is provided with a blind which is operative to maintain the lighttightness of the chamber until the formation of the visible image within the film has been substantially completed. The blind is locked and maintained in its operative position until the formation of such image, whereupon the blind is released for movement to a position in which the film unit may be viewed in place through the window.

9 Claims, 4 Drawing Figures

CAMERA HAVING CHAMBER FOR STORING EXPOSED FILM UNITS DURING THEIR DEVELOPMENT

RELATED APPLICATION

This application is related to our copending application Ser. No. 866,066 filed May 20, 1986, entitled "Compact Folding Camera Construction".

BACKGROUND OF THE INVENTION

This invention relates to apparatus for use with instant or self-developing type film units, and more particularly to a camera having a lighttight imbibition chamber for storing a film unit until a visible image has been substantially formed therein.

Attempts to decrease the volume of apparatus for use with instant type film, e.g., cameras and camera backs, have been successful, in part, by providing the film units with either a chemical or mechanical opacification system for preventing further exposure of the film unit's emulsion or photosensitive layer by the ambient light during the formation of a visible image, thus obviating the need for a lighttight imbibition chamber in the apparatus. However, providing such apparatus with a lighttight imbibition chamber may provide one with benefits which offset, in part, any disadvantage caused by the space which it takes up. For example, less of the opacification material, e.g., opacifying dyes, would be needed in the processing liquid of an instant type film unit which is to be maintained in a light free environment, subsequent to the spreading of the processing liquid across a layer of the film unit, until the latent image within the film unit is no longer susceptible to being further exposed by ambient light. Thus, the cost of the processing liquid would be less, the layer of processing liquid which is to be spread between the image receiving layer and the photosensitive layer could thereby be thinner thus improving resolution of the image and reducing the time required to produce a visible image.

The overall volume of instant type cameras having lighttight imbibition chambers may be minimized by moving the film unit away from its cassette and then reversing its movement and directing it to an imbibition chamber located substantially under the cassette. Typical examples of such cameras are described in U.S. Pat. Nos. 3,687,032, 3,683,771, and 3,537,370. However, each of these cameras needs an additional housing for temporarily enclosing the film unit during its movement away from the film cassette.

U.S. Pat. No. 3,426,664 discloses yet another type of instant camera in which the imbibition chamber is located rearwardly of a film cassette. In this camera, miniaturization is further enhanced by bending the exposed film unit around a motor prior to moving it toward the imbibition chamber rather than moving the film unit in a reciprocating manner, as described in the aforementioned patents.

A basic fault with the cameras described above is that one must open the camera in order to view an exposed film unit while it is located in the imbibition chamber. In other words, the user of the camera must handle the film unit in order to determine if he has correctly captured on film the scene which he was attempting to photograph. Such handling of the film unit could result in other film units located in the imbibition chamber being inadvertentaly withdrawn and dropped on the ground. Still further, if the user desires to return the film unit to the imbibition chamber for temporary storage, care must be taken to insure its proper placement therein such that it will not interfere with any subsequent film units entering the imbibition chamber.

U.S. Pat. No. 4,265,525 granted to Joseph A. Stella et al. describes an instant type camera which is adapted to receive a film cassette containing a rotatable disc carrying seven film units of the instant type. The film cassette includes a first aperture in a forward wall through which the film units are adapted to be sequentially aligned and exposed, and a second opening located in alignment with a third opening in the cassette's bottom wall. After exposure of a film unit, the disc is rotated so as to move the exposed film unit past a spreader bar which ruptures a pod of processing liquid and spreads its contents across the exposed film unit to initiate the formation of a visible image therein while simultaneously advancing the film unit to a position between and in alignment with the second and third openings. The second and third openings are located in alignment with openings in the camera's top and bottom walls thus enabling the exposed film unit (a positive transparency) to be viewed in place. Should the film units be of a type which require a light free environment during imbibition of the processing liquid, a blind may be provided on the film cassette or on the camera. Apparently, the blind would be located in lighttight relation with the second and third openings until such time that the ambient light would not adversely affect the developing image. Then, the blind would be manually moved to an inoperative position to allow viewing of the visible image within the film unit.

While the camera described in the '525 patent allows for in place viewing of the processed film unit, one must be careful not to move the blind to its inoperative position too early thus possibly fogging the resultant photograph image. Further, the processed film unit cannot be removed from the camera for whatever reason, such as comparison with another photograph or for viewing by others while the photographer is exposing the next film unit, unless the entire film cassette is removed from the camera, thus temporarily stopping further photographic action regarding that film cassette. Still further, if the film cassette were removed from the camera for viewing of the processed film unit, movement of the blind to a position uncovering the second and third openings would result in the first opening also being uncovered, thereby fogging the underlying unexposed film unit.

SUMMARY OF THE INVENTION

The present invention relates to a self-developing or instant type photographic apparatus, e.g., a camera, having a lighttight imbibition chamber in which an exposed film unit is adapted to remain until its latent image has been substantially transformed into a viewable image. The apparatus includes a housing enclosing a film chamber having structure for locating and supporting a film assemblage in position for the sequential exposure of a plurality of film units located therein. Located rearwardly or below the film assemblage supporting structure is a chamber which is adapted to receive an exposed film unit, subsequent to a processing liquid being spread across a layer thereof, and maintain it in a lighttight environment until the processing liquid has sufficiently imbibed the film unit to cause the formation of a visible image. The apparatus includes a battery operated motor mounted adjacent one end of the film assemblage supporting structure and means for advancing an exposed film unit from the assemblage's film cassette, around the motor and then to the lighttight imbibition chamber. The aformentioned means includes a cantilevered member having a free end which is adapted to move an uppermost film unit from the film cassette; laterally spaced pairs of superposed friction wheels which are adapted to engage the lateral sides of the exposed film unit and continue its movement away from the film cassette and around the motor and toward a pair of cylindrically configured superposed rollers; the superposed rollers; and a second cantilevered member for advancing the exposed film unit into the imbibition chamber. The rollers are adapted to rupture a container of processing liquid carried on a leading end of the advancing film unit and spread its contents across a layer thereof to initiate the formation of a visible image therein by a diffusion process. As the exposed film unit leaves the bite of the rollers, its trailing end is located in a position to be engaged by the second cantilevered member for subsequent movement into the imbibition chamber.

The apparatus further includes a loading door through which a film assemblage may be located on the aforementioned supporting structure. The loading door, which comprises one of the walls of the imbibition chamber, has a window therein through which the visible image in a film unit located within the imbibition chamber may be viewed without opening the loading door. Such window is ordinarily rendered lighttight by a blind which is movable from its operative position covering the window, to an inoperative position wherein the film unit within the chamber may be viewed. The blind is maintained in the operative position by a latch until the formation of a visible image within the last exposed unit to enter the imbibition chamber has been substantially formed. After the formation of the visible image, a timing circuit energizes a solenoid to move the latch to a position wherein the blind may be moved to its inoperative position.

The imbibition chamber is also provided with a light sealed opening through which all of the film units located within the imbibition chamber may be moved as a unit to the exterior of the photographic apparatus. Suitable means, such as a manually actuatable slide, is provided for such purpose.

An object of the invention is to provide photographic apparatus of the instant type with an imbibition chamber having a window through which the image in the last film unit to be exposed and positioned therein may be viewed, such window being covered in a lighttight manner during the time period that the latent image within the exposed film unit is still subject to being further exposed by ambient light entering such chamber by the window.

Another object of the invention is to provide such an apparatus with means for automatically uncovering the window of the imbibition chamber at the end of a predetermined time period, such time period starting with the application of a processing liquid to the exposed film unit and ending when the forming image within the film unit is no longer subject to be adversely affected by light entering the chamber via the window.

Other objects of the invention will in part be obvious and will in part appear hereinafter.

The invention comprises the apparatus possessing the construction, combination of elements and arrangement of parts which are exemplified in the following detailed disclosure, and the scope of the application of which will be indicated in the claims

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
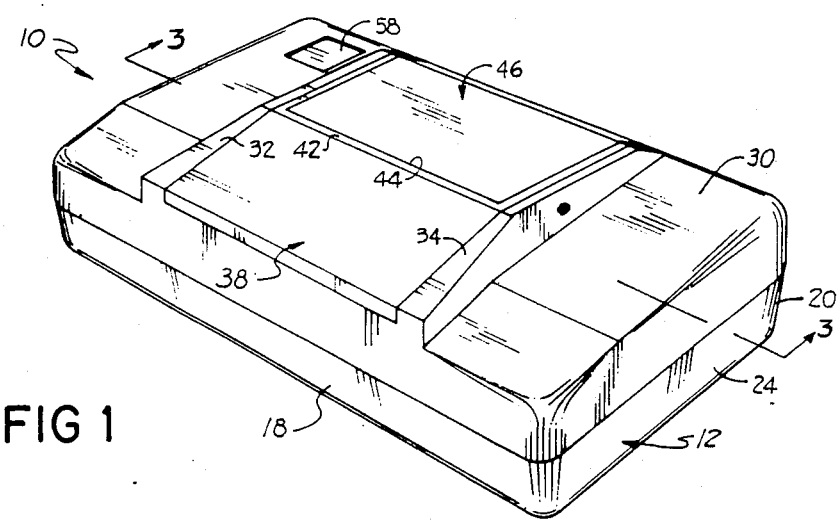
FIG. 1 is a perspective view of a folding type instant type camera which incorporates the present invention, the camera being shown in a folded condition.

Reference is now made to the drawings wherein is shown photographic apparatus in the form of a folding camera 10 of the instant or self-developing type. The camera 10 includes a first or main housing 12 having a loading door 14 in a bottom wall 16 thereof. The first housing 12 also includes front and rear walls 18 and 20, respectively, and end walls 22 and 24. The door 14 is pivotally connected to the end wall 22 of the main housing 12 by a hinge (not shown) which is generally parallel with the axis of the camera's objective lens 28 and perpendicular to the forward and rear walls 18 and 20. The main housing 12 further includes a top wall 30 having a pair of spaced flanges 32 and 34 extending upwardly therefrom so as to define a recess 36.

Figure 2:
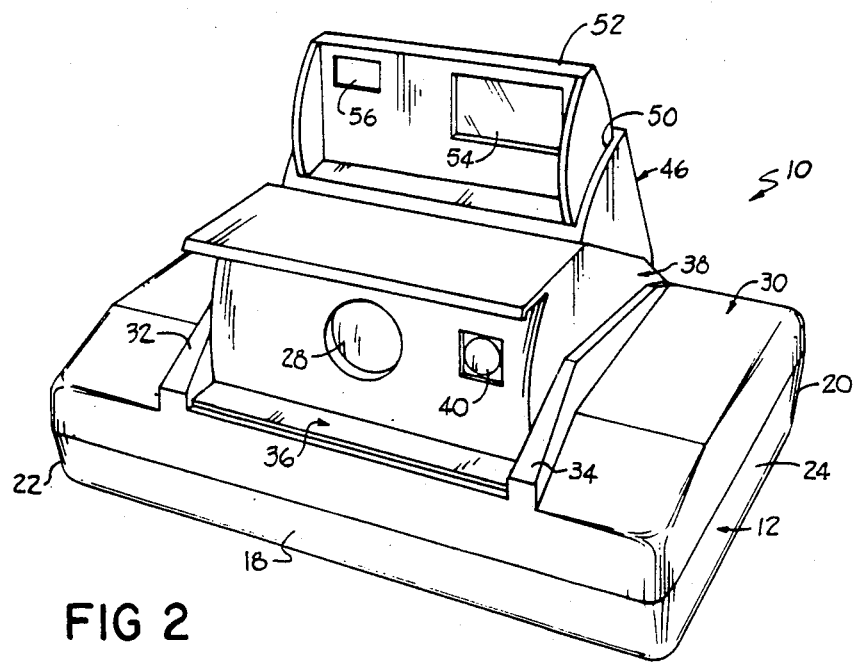
FIG. 2 is a perspective view showing the camera of FIG. 1 in an extended operative condition.

The camera 10 further includes a second housing 38 which is pivotally coupled to the first housing 12 about an axis (not shown) which is generally parallel with the rear wall 20 for movement between an inoperative position (see FIG. 1), wherein it is nested within the recess 36, and its operative position, as shown in FIG. 2. The second housing 38 supports the aforementioned objective lens 28, a shutter assembly, and a photocell window 40. A top wall 42 of the second housing includes a recess 44 which is adapted to receive a third housing 46 of the camera 10 when the camera is being collapsed or folded.

The third housing 46 is pivotally coupled to the rear wall 20 of the first housing 12 about a horizontal axis (not shown) which is generally parallel with the rear wall 20. The third housing 46 is provided with a recess 50 for pivotally receiving therein a fourth housing 52.

The fourth housing 52 supports a source of artificial illumination such as a strobe 54 and a ranging window 56. The fourth housing 52, as well as the second and third housings 38 and 46, is biased into the erect position shown in FIG. 2. Further, the fourth section 52 is adapted to be nested within the recess 50 prior to the third housing 46 being moved into the recess 44.

When the various housings are in the positions shown in FIG. 2, actuation of an exposure cycle initiation button 58 (see FIG. 1) located within a recess in the top wall 30 of the first housing 12 is effective to cause image bearing light rays to enter the camera 10 via the lens 28 and be reflected downwardly by a mirror (not shown) onto a film unit 62. For more specific details of the camera 10, reference may be had to our aforementioned copending application Ser. No. 866,066.

The camera 10 is adapted to receive a film assemblage of the type which includes a film cassette 60 having therein a stack of the film units 62 which is resiliently biased by a spring 64 toward a forward wall 66 of the cassette 60 so as to locate the uppermost film unit 62 adjacent to an exposure aperture 68 in the wall 66. The film units 62 are of the integral self-developing or instant type and include a rupturable pod 70 of processing liquid at their leading ends and a trap 72 at their trailing end for receiving any excess processing liquid, as is well known in the art. The camera 10 includes a plate 74 for supporting the film cassette 60 in position for the sequential photographic exposure of the film units 62. The plate 74 includes an upwardly curved end section 76 for engaging a leading end wall 78 of the film cassette 60 and an upwardly standing flange 80 for engaging a trailing end wall 82 of the film cassette 60, thereby properly locating the film cassette 60 relative to the reflected optical axis of the objective lens 28.

Figure 3:
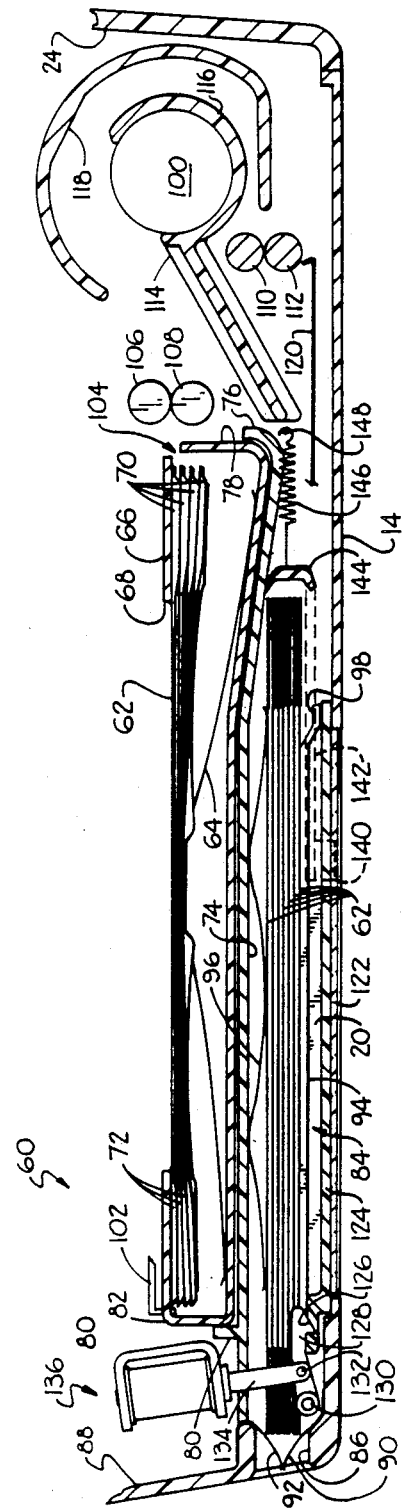
FIG. 3 is an enlarged cross sectional view, partly in section, of the camera, taken generally along the line 3—3 of FIG. 1, the upper portion of the camera being omitted for reasons of clarity.

The camera 10 also includes a lighttight imbibition chamber 84 which is defined in part by the loading door 14, the support plate 74, and the forward and rear walls 18 and 20 of the first housing 12. The imbibition chamber 84 provides a lighttight environment in which exposed film units 62 may be located during the period that the aforementioned processing liquid is being imbibed by one or more layers of the film unit 62. Exit of the film units 62 from the imbibition chamber 84 may be had by way of an egress opening 86 formed in an upturned end 88 of the loading door 14, such opening being rendered lighttight by a pair of resilient, opaque, cantilevered members 90 and 92. A flange 94 (only one shown) extends inwardly for a short distance from each of the walls 18 and 20 of the imbibition chamber 84 for supporting the exposed film units 62, as shown in FIG. 3. A spring 96 is mounted on the supporting wall 74 for frictionally maintaining the exposed film units in place. Each of the flanges 94 is provided with a downwardly turned portion 98 at one end there which function as ramps to guide the leading ends of the exposed film units 62 up onto the flanges 94.

Subsequent to the exposure of a film unit 62, a motor 100 is energized to drive a film advancing member 102 in a reciprocating manner to engage the exposed film unit by its trailing edge and advance it to the exterior of the film cassette 60 via an exit opening 104. As the exposed film unit 62 emerges from the film cassette 60 it enters the bite of laterally spaced pairs (only one pair being shown) of motor driven friction wheels 106 and 108. The wheels 106 and 108 engage lateral sides of the exposed film unit at areas outside its picture area, and outside of the ends of the processing liquid container 70. The two pairs of friction wheels 106 and 108 continue the movement of the exposed film unit 62 until its leading end is located in the bite of a pair of motor driven rollers 110 and 112 having a length substantially equal to the width of the exposed film unit 62. During such movement, the leading end of the exposed film unit 62 engages a pair of laterally spaced ramps (only one shown) 114 of a motor support 116 and is deflected upwardly into engagement with a curved plate 118 which guides the exposed film unit 62 around the motor 100 and its support 116 and directs it into the bite of the rollers 110 and 112. The rollers 110 and 112 continue the movement of the exposed film unit 62 toward the imbibition chamber 84 while simultaneously rupturing the container 70 of processing liquid and spreading its contents between layers of the film unit 62 to initiate the formation of a visible image within the film unit via a diffusion transfer process. As the exposed film unit 62 emerges from between the rollers 110 and 112, its leading end engages the underside of the ramp 114 and is deflected downwardly and then along a second cantilevered film advancing member 120 until it rides up the ramps 98 and partially onto the flanges 94 in the imbibition chamber 84. At this point, the trailing end of the film unit 62 containing the trap 72 emerges from between the rollers 110 and 112 and snaps downwardly into engagement with the film advancing member 120 as the exposed film unit 62 attempts to return to its original planar configuration. The film advancing member 120 is now driven by the motor 100 in a reciprocating manner so as to engage the exposed film unit 62 by its trailing edge and continue its movement up onto the flanges 94 where it will remain in a lighttight environment for a predetermined period of time until the processing liquid has been sufficiently imbibed by layers of the film unit. As stated previously, the predetermined period of time starts substantially at the time that the processing liquid is spread across the exposed film unit and ends when the emerging image within the exposed film unit 62 will no longer be substantially adversely affected by any ambient light which may enter the imbibition chamber 84 via a viewing window 122 located within the loading door 14. The viewing window 122 has dimensions which generally are the same as those of the image area in the exposed film unit 62.

The viewing window 122 is generally covered in lighttight relation by an opaque blind 124 thereby maintaining the lighttightness of the imbibition chamber 84. The blind 124 is provided with an aperture 126 at one end thereof for receiving a free end of a latch 128. The latch 128 is adapted to releasably maintain the blind 124 in its operative light blocking position against the bias of a spring (not shown) which in turn is adapted to move the blind 124 into its inoperative position wherein the image in the exposed film unit 62 may be viewed. The latch 128 is pivotally coupled at 130 to a fixed portion of the camera 10 and at 132 to an arm 134 of a solenoid 136. The solenoid 136 is temporarily energized at the end of the aforementioned predetermined period of time, e.g., thirty seconds, so as to pivot the latch 128 in a counterclockwise manner, as viewed in FIG. 3, thus releasing the blind 124 for automatic movement into its inoperative position. Alternatively, the blind 124 could be provided with a manually actuated member for moving the blind 124 into its inoperative position subsequent to the actuation of the latch 128.

Figure 4:
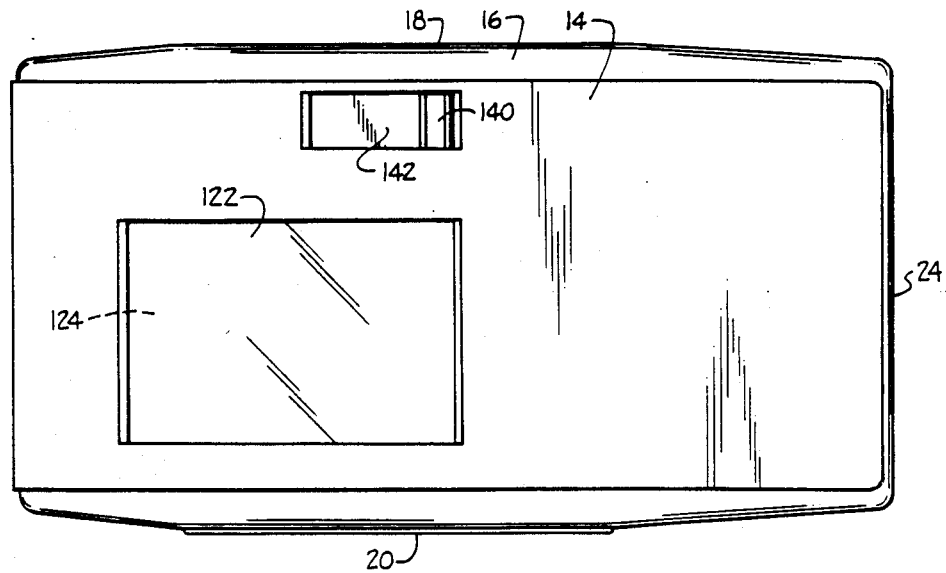
FIG. 4 is a bottom view of the camera.

After the image in the exposed film unit 62 has been viewed through the uncovered window 122. The operator of the camera 10 may either leave it in the imbibition chamber and continue to photographic subjects, or remove the exposed film unit 62 for closer inspection. To remove the exposed film unit 62 from the imbibition chamber 84, the operator merely moves a button 140, to the left as viewed in FIG. 4. The bottom 140 is attached to a slide plate 142 having an inwardly turned film engaging end 144. As can be seen in FIG. 3, such movement of the film engaging end 144 is effective to move all of the film units (six being shown) from the imbibition chamber 84 via the opening 86 to a position whereat the operator may grasp them and complete their removal. A spring 146 having one end attached to the film engaging end 144 and its opposite end attached to a pin 148 extending inwardly from a wall of the imbibition chamber 84 is provided for returning the film engaging end 144 to the position shown in FIG. 3. If the operator desires to leave the exposed film units 62 within the imbibition chamber and continue photographing subjects, actuation of the exposure cycle initiation button 58 not only actuates the shutter but also completes a circuit to the motor 100. The motor 100 in turn drives the various elements described above for advancing the newly exposed film unit 62 from the cassette 60 to the bottom of the stack of film units 62 already in the imbibition chamber 84. The motor 100 also drives suitable means such as a cam (not shown) which drives the blind 124 back into latched relation with the latch 128 thereby rendering the imbibition chamber 84 lighttight.

After all of the film units 62 have been exposed and removed from the imbibition chamber 84, the empty film cassette 60 may be removed by unlatching and pivoting the loading door 14 in a clockwise manner about its hinge (not shown). As the loading door 14 is pivoted toward its open position it carries therewith among other elements, the support plate 74 carrying the film cassette 60, the second film advancing means 120, the blind 124, the solenoid 136 and the slide plate 142, end 144, spring 146 and pin 148, thereby providing easy access to the fixed structure such as the friction wheels 106 and 108 and the rollers 110 and 112.

Since certain changes may be made in the above described apparatus without departing from the scope of the invention herein involved, it is intended that all matter contained in the above description or shown in the accompanying drawings shall be interpreted as illustrative and not in a limiting sense.

What is claimed is:

1. Photographic apparatus comprising:
   means for supporting a film cassette containing a plurality of film units of the instant type in position for their sequential exposure;
   means for defining a lighttight imbibition chamber, said means including a window through which an exposed film unit may be viewed subsequent to the formation of a visible image therein;
   means for advancing a film unit, subsequent to its exposure, from the film cassette to said imbibition chamber, said advancing means including means for spreading a processing liquid across a layer of the exposed film unit so as to initiate the formation of a visible image therein;
   means for defining an egress through which the exposed film units may be advanced from said imbibition chamber to the exterior of said apparatus;
   means for preventing the entry of light, actinic to an exposed film unit, into said imbibition chamber via said window, said light preventing means being movable from an operable light blocking position to an inoperative position in which a film unit containing a visible image may be viewed through said window;
   latching means for releasably maintaining said light preventing means in said operative position; and
   means, actuatable after a predeter for moving said latching means to a position in which said light preventing means may be moved to said inoperative position.

2. Photographic apparatus as defined in claim 1 wherein said predetermined period of time is at least as long as the period of time between the spreading of the processing liquid across the layer of the film and the point in time whereat the developing image would no longer be adversely affected by light entering said imbibition chamber via said window.

3. Apparatus as defined in claim 2 wherein said means for defining an imbibition chamber includes a loading door having said window mounted therein, said loading door including a major surface located in a plane which is substantially parallel with and located rearwardly from a plane in which a film unit is to be located during its exposure.

4. Apparatus as defined in claim 3 further including manually actuatable means for moving a film unit from said imbibition chamber to the exterior of said apparatus via said egress.

5. Apparatus as defined in claim 4 wherein said manually actuatable means is configured to simultaneously engage all of the exposed film units in said imbibition chamber and move then as a unit to the exterior of said apparatus.

6. Apparatus as defined in claim 2 further including means for resiliently biasing said light preventing means toward said inoperative position.

7. Apparatus as defined in claim 2 further including means for maintaining an exposed film unit in a curved configuration as its leading end containing a rupturable container of processing liquid enters said spreading means.

8. Apparatus as defined in claim 2 wherein said advancing means includes, in addition to said spreading means, first means for advancing a film unit from the cassette subsequent to its exposure, second means for continuing the movement of the film unit from the cassette into engagement with said spreading means, and third means for moving the film unit from a position adjacent said spreading means to said imbibition chamber, said apparatus further including a battery driven motor for driving said first, second and third means as well as said spreading means.

9. Apparatus as defined in claim 3 further including means for guiding each exposed film unit, as it initially enters said imbibition chamber, to a position immediately adjacent said light preventing means, thereby placing the last film unit to enter said imbibition chamber in position to be viewed through said window.

* * * * *